United States Patent
Garg et al.

(10) Patent No.: US 12,511,936 B2
(45) Date of Patent: Dec. 30, 2025

(54) PUPIL DETECTION USING CIRCLE FORMATION BASED SCORING METHOD

(71) Applicant: Tata Consultancy Services Limited, Mumbai (IN)

(72) Inventors: Surabhi Garg, New Delhi (IN); Seshu Sri Ponnapalli, Hyderabad (IN); Rajan Mindigal Alasingara Bhattachar, Bangalore (IN); Arvind Ramchandra Jadhav, Hyderabad (IN); Deepthi Kollipara, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 291 days.

(21) Appl. No.: 18/355,611

(22) Filed: Jul. 20, 2023

(65) Prior Publication Data
US 2024/0037988 A1    Feb. 1, 2024

(30) Foreign Application Priority Data
Jul. 27, 2022   (IN) .............................. 202221043091

(51) Int. Cl.
*G06V 40/18* (2022.01)
*G06T 5/77* (2024.01)
*G06T 7/62* (2017.01)

(52) U.S. Cl.
CPC .............. *G06V 40/197* (2022.01); *G06T 5/77* (2024.01); *G06T 7/62* (2017.01); *G06T 2207/20076* (2013.01)

(58) Field of Classification Search
CPC ........... G06V 40/197; G06T 7/62; G06T 5/77; G06T 2207/20076
See application file for complete search history.

(56) References Cited
U.S. PATENT DOCUMENTS 5,050,222 A * 9/1991 Lee .................... G06V 30/1444
                                                382/176
6,714,665 B1 * 3/2004 Hanna ...................... G07C 9/37
                                                382/209

(Continued)

OTHER PUBLICATIONS

Md. Amir Sohail et al. "An Efficient Approach to Remove Specular Reflection from Non-Ideal Eye Image," Proceedings of the International Conference on Computing and Communication Systems, 2021, Springer Link, https://www.researchgate.net/publication/350799197_An_Efficient_Approach_to_Remove_Specular_Reflection_from_Non-Ideal_Eye_Image.

(Continued)

*Primary Examiner* — Qun Shen
(74) *Attorney, Agent, or Firm* — Finnegan, Henderson, Farabow, Garrett & Dunner, LLP

(57) ABSTRACT

The present disclosure detects a pupil of an eye using circle formation based scoring method. The conventional approaches fail to provide an accurate and reliable biometric authentication due to the usage of simple thresholding based statistical methods and iris dependent segmentation methods. The present disclosure utilizes a circle plotting approach and selects the optimum circle using several parameters. The present disclosure can generate a pupil boundary that fits the pupil region inside an iris perfectly. Initially, the system receives an input image of an eye. After removing reflections, a core point of the reflection free image is identified. Further, a plurality of points are obtained based on a sudden gradient change. and a plurality of circles are plotted. Further, an optimum circle is identified using a score based optimum circle selection method. Finally, the pupil associated with the input image is identified based on the optimum circle.

6 Claims, 10 Drawing Sheets

(56) References Cited

U.S. PATENT DOCUMENTS

| | | | |
|---|---|---|---|
| 8,885,882 B1* | 11/2014 | Yin | G06V 40/19 |
| | | | 382/103 |
| 2004/0190783 A1* | 9/2004 | Sakai | G06T 9/00 |
| | | | 382/232 |
| 2006/0247942 A1* | 11/2006 | Payne | G06Q 10/00 |
| | | | 345/589 |
| 2007/0202477 A1* | 8/2007 | Nakagawa | G01N 21/359 |
| | | | 434/236 |
| 2007/0244927 A1* | 10/2007 | Lee | G16H 20/40 |
| 2012/0275665 A1* | 11/2012 | Bergen | G06V 40/18 |
| | | | 382/117 |
| 2016/0026863 A1 | 1/2016 | Hakoshima | |
| 2017/0332899 A1* | 11/2017 | Walsh | A61B 3/102 |
| 2019/0266232 A1* | 8/2019 | Khan | G06F 16/904 |
| 2019/0335110 A1* | 10/2019 | Kobayashi | H04N 23/667 |
| 2022/0028504 A1* | 1/2022 | Luo | G06F 21/6218 |

OTHER PUBLICATIONS

Dewu Chen et al. "Research on Pupil Center Location Based on Improved Hough Transform and Edge Gradient Algorithm," National Conference on Information Technology and Computer Science, 2012, Atlantis Press, https://www.researchgate.net/publication/266643494_Research_on_Pupil_Center_Location_Based_on_Improved_Hough_Transform_and_Edge_Gradient_Algorithm.

* cited by examiner

PUPIL DETECTION USING CIRCLE FORMATION BASED SCORING METHOD

PRIORITY CLAIM

This U.S. patent application claims priority under 35 U.S.C. § 119 to: India Application No. 202221043091, filed on Jul. 27, 2022. The entire contents of the aforementioned application are incorporated herein by reference.

TECHNICAL FIELD

The disclosure herein generally relates to the field of image processing and, more particularly, to a method and system for pupil detection using circle formation based scoring method.

BACKGROUND

Pupil is a colored tissue that makes the eye color at the front of the eye and it is the darkest region in the eye. Pupil detection in the human eye has multiple applications, for example, primarily the iris segmentation for iris based authentication systems. However, pupil detection is a challenging task because of several parameters. These include the ocular reflections, diseases such as cataract, diabetes, etc., pupil dilation, and contact lenses. Further, sometimes, the eye may be half closed while capturing the eye or eyelashes could be present over the pupil region.

Conventionally, pupil is segmented using statistical methods, based on thresholding or methods like Hough circle transforms. However, the pupil segmentation is unsuccessful using statistical methods which resulted in poor iris segmentation. Further, some other conventional methods utilized non-statistical pupil detection methods which rely on iris boundary for pupil segmentation. In some other conventional methods, the pupil is identified only based on Euclidean distance between two concentric circles which results in inaccurate segmentation of the pupil. Thus, the conventional approaches fail to provide an accurate and reliable biometric authentication.

SUMMARY

Embodiments of the present disclosure present technological improvements as solutions to one or more of the above-mentioned technical problems recognized by the inventors in conventional systems. For example, in one embodiment, a method for Pupil detection using circle formation based scoring method is provided. The method includes receiving by one or more hardware processors, an input image captured by an image acquisition device, wherein the input image pertains to an eye of a user. Further, the method includes obtaining, by the one or more hardware processors, a reflection free image by removing ocular reflections from the input image using an inpainting algorithm. Furthermore, the method includes identifying, by the one or more hardware processors, a core point of the reflection free image based on a longest continuous black pixel row and a longest continuous black pixel column, wherein an intersecting point between the longest continuous black pixel row and the longest continuous black pixel column is identified as the core point. Furthermore, the method includes generating, by the one or more hardware processors, a plurality of points based on a sudden gradient change of pixels by traversing in a plurality of individual directions from the core point. Furthermore, the method includes plotting, by the one or more hardware processors, a plurality of circles based on the plurality of points using a permutation combination based circle plotting technique, wherein at least three points are considered at a time for plotting the plurality of circles. Furthermore, the method includes identifying, by the one or more hardware processors, an optimum circle from among the plurality of circles, using a score based optimal circle selection method. Finally, the method includes identifying, by the one or more hardware processors, a pupil associated with the input image based on the optimum circle, wherein an inner part of the optimum circle is identified as the pupil.

In another aspect, a system for Pupil detection using circle formation based scoring method is provided. The system includes at least one memory storing programmed instructions, one or more Input/Output (I/O) interfaces, and one or more hardware processors operatively coupled to the at least one memory, wherein the one or more hardware processors are configured by the programmed instructions to receive an input image captured by an image acquisition device, wherein the input image pertains to an eye of a user. Further, the one or more hardware processors are configured by the programmed instructions to obtain a reflection free image by removing ocular reflections from the input image using an inpainting algorithm. Furthermore, the one or more hardware processors are configured by the programmed instructions to identify a core point of the reflection free image based on a longest continuous black pixel row and a longest continuous black pixel column, wherein an intersecting point between the longest continuous black pixel row and the longest continuous black pixel column is identified as the core point. Furthermore, the one or more hardware processors are configured by the programmed instructions to generate a plurality of points based on a sudden gradient change of pixels by traversing in a plurality of individual directions from the core point. Furthermore, the one or more hardware processors are configured by the programmed instructions to plot a plurality of circles based on the plurality of points using a permutation combination based circle plotting technique, wherein at least three points are considered at a time for plotting the plurality of circles. Furthermore, the one or more hardware processors are configured by the programmed instructions to identify an optimum circle from among the plurality of circles, using a score based optimal circle selection method. Finally, the one or more hardware processors are configured by the programmed instructions to identify a pupil associated with the input image based on the optimum circle, wherein an inner part of the optimum circle is identified as the pupil.

In yet another aspect, a computer program product including a non-transitory computer-readable medium having embodied therein a computer program for Pupil detection using circle formation based scoring method is provided. The computer readable program, when executed on a computing device, causes the computing device to receive an input image captured by an image acquisition device, wherein the input image pertains to an eye of a user. Further, computer readable program, when executed on a computing device, causes the computing device to obtain a reflection free image by removing ocular reflections from the input image using an inpainting algorithm. Furthermore, computer readable program, when executed on a computing device, causes the computing device to identify a core point of the reflection free image based on a longest continuous black pixel row and a longest continuous black pixel column, wherein an intersecting point between the longest continuous black pixel row and the longest continuous black pixel column is identified as the core point. Furthermore, computer readable program, when executed on a computing device, causes the computing device to generate a plurality of points based on a sudden gradient change of pixels by traversing in a plurality of individual directions from the core point. Furthermore, computer readable program, when executed on a computing device, causes the computing device to plot a plurality of circles based on the plurality of points using a permutation combination based circle plotting technique, wherein at least three points are considered at a time for plotting the plurality of circles. Furthermore, computer readable program, when executed on a computing device, causes the computing device to identify an optimum circle from among the plurality of circles, using a score based optimal circle selection method. Finally, computer readable program, when executed on a computing device, causes the computing device to identify a pupil associated with the input image based on the optimum circle, wherein an inner part of the optimum circle is identified as the pupil.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
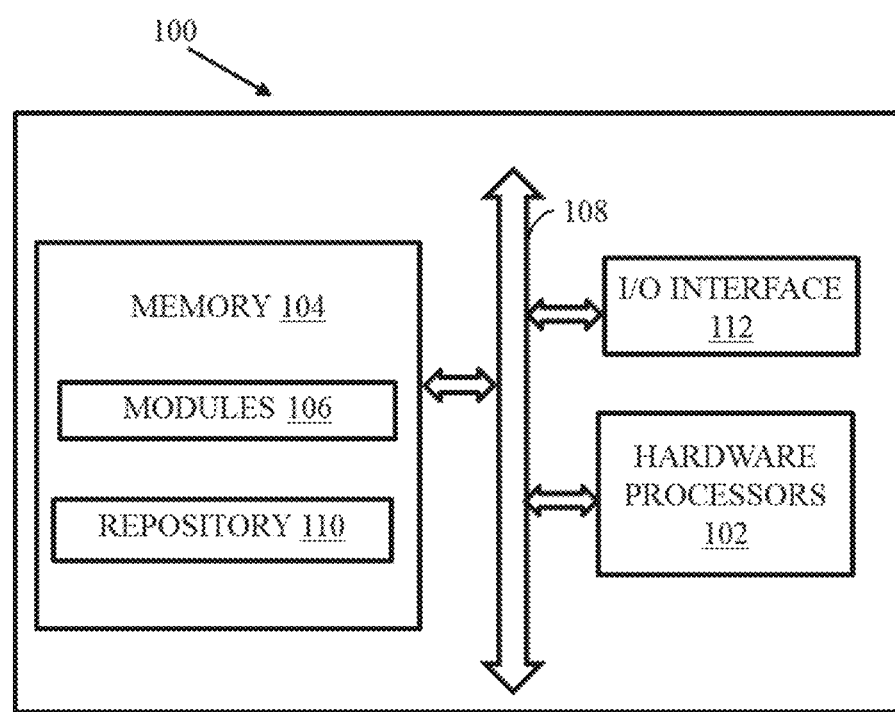
FIG. 1 is a functional block diagram of a system for pupil detection using circle formation based scoring method, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Conventional pupil segmentation methods are mostly statistical based and the pupil segmentation using such methods is unsuccessful which resulted in poor iris segmentation. Further, some other conventional methods utilized non-statistical pupil detection methods which rely on iris boundary for pupil segmentation. In some other conventional methods, the pupil is identified only based on Euclidean distance which results in inaccurate segmentation of the pupil. Thus, the conventional approaches fail to provide an accurate and reliable biometric authentication.

Embodiments herein provide a method and system for pupil detection using circle formation based scoring method. The present disclosure utilizes a circle plotting approach from a base core point inside the pupil boundary and selects the optimal circle using several parameters. The present disclosure can generate a pupil boundary that fits the pupil region inside an iris perfectly. Initially, the system receives an input image of an eye captured by an image acquisition device. Further, a reflection free image is obtained by removing ocular reflections from the input image using an inpainting algorithm. After removing reflections, a core point of the reflection free image is identified based on a longest continuous black pixel row and a longest continuous black pixel column. Here, an intersecting point between the longest continuous black pixel row and the longest continuous black pixel column is identified as the core point. Further, a plurality of points are obtained based on a sudden gradient change by traversing in a plurality of individual directions from the core point. Further, a plurality of circles are plotted based on the plurality of points using a permutation combination based circle plotting technique. Any three or more points are considered at a time for plotting the plurality of circles. After plotting the plurality of circles, an optimal circle is identified based on the plurality of circles using a score based optimal circle selection method. Finally, the pupil associated with the input image is identified based on the optimal circle.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a functional block diagram of a pupil detection using circle formation based scoring method, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases. For example, other devices comprises a plurality of sensors and a plurality of camera.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 5:
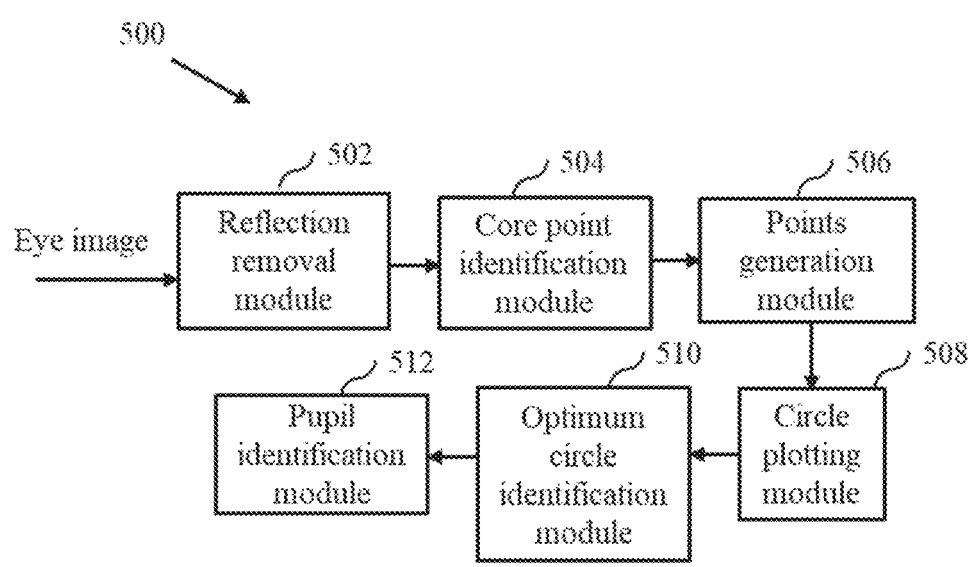
FIG. 5 illustrates a functional architecture for the processor implemented method for pupil detection using circle formation based scoring method, in accordance with some embodiments of the present disclosure.

The plurality of modules 106 include programs or coded instructions that supplement applications or functions performed by the system 100 for pupil detection using circle formation based scoring method. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the pupil detection using circle formation based scoring method. In an embodiment, the modules 106 includes a reflection removal module (shown in FIG. 5), a core point identification module (shown in FIG. 5), a point generation module (shown in FIG. 5), a circle plotting module (shown in FIG. 5), an optimal circle identification module (shown in FIG. 5), and a pupil identification module (shown in FIG. 5). In an embodiment, FIG. 5 illustrates a functional architecture of the system of FIG. 1, for pupil detection using circle formation based scoring method, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIGS. 2 and 4 and the components depicted in FIG. 5.

Figure 2:
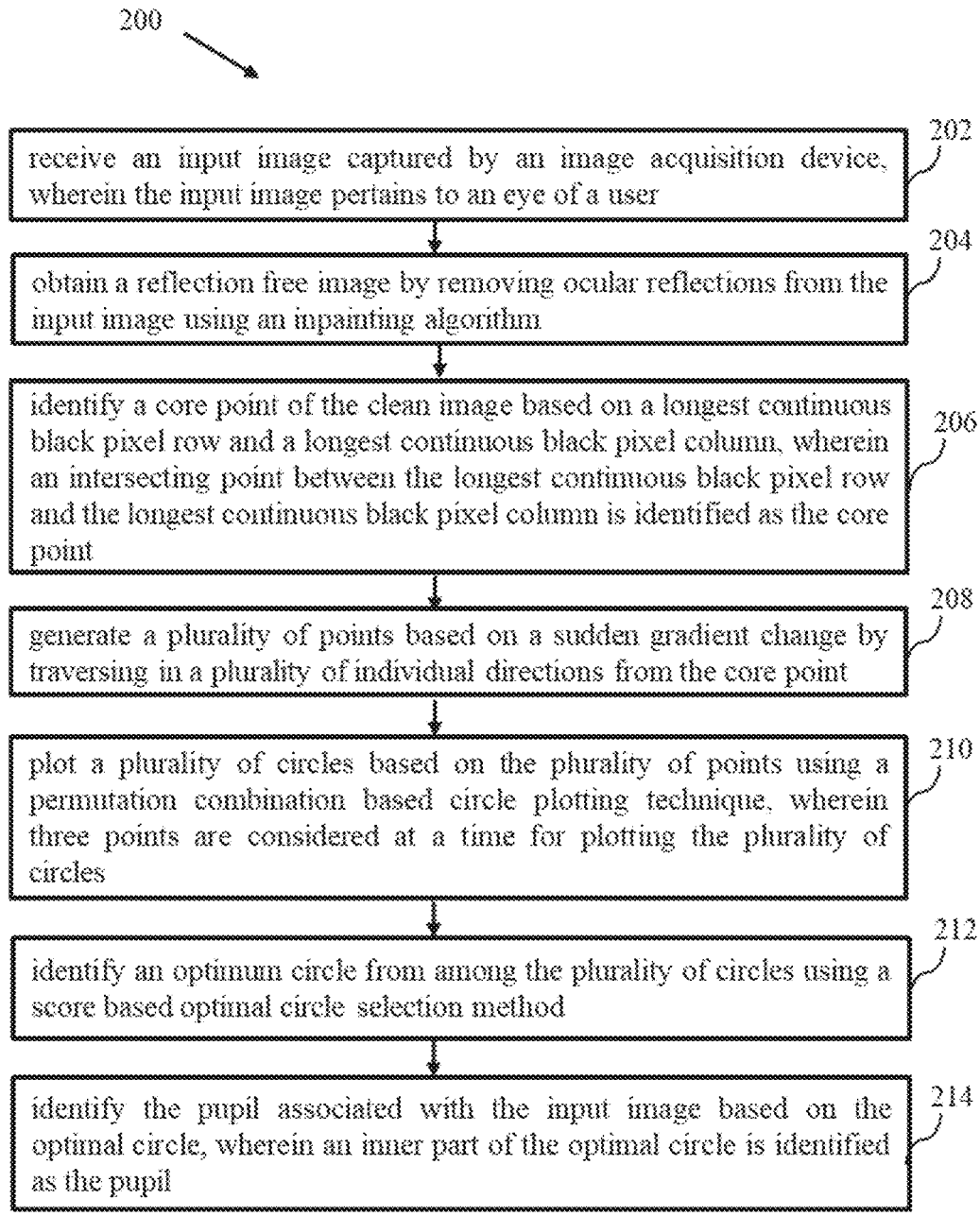
FIG. 2 is an exemplary flow diagram illustrating a processor implemented method for pupil detection using circle formation based scoring method, implemented by the system of FIG. 1, in accordance with some embodiments of the present disclosure.

FIG. 2 is an exemplary flow diagram illustrating a method 200 for pupil detection using circle formation based scoring method implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive the input image of an eye, captured by an image acquisition device. The input image can be in any colour format.

Figure 3A:
FIGS. 3A, 3B, 3C, 3D, 3E, 3F, and 3G illustrate example outputs associated with the processor implemented method for pupil detection using circle formation based scoring method, in accordance with some embodiments of the present disclosure.
Figure 3B:

At step 204 of the method 200, the reflection removal module 502 executed by one or more hardware processors 102 is configured by the programmed instructions to obtain the reflection free image by removing ocular reflections from the input image using the inpainting algorithm or similar other algorithms as shown in FIG. 3A and FIG. 3B. For example, the eye image shown in FIG. 3A is the input image, wherein the input image includes the ocular reflection 302. FIG. 3B illustrates the eye image after removing the ocular reflection using the inpainting algorithm. Here, the ocular reflection is a white region 302 and the inpainting algorithm fills the white region 302 with the surrounding color.

Figure 3C:
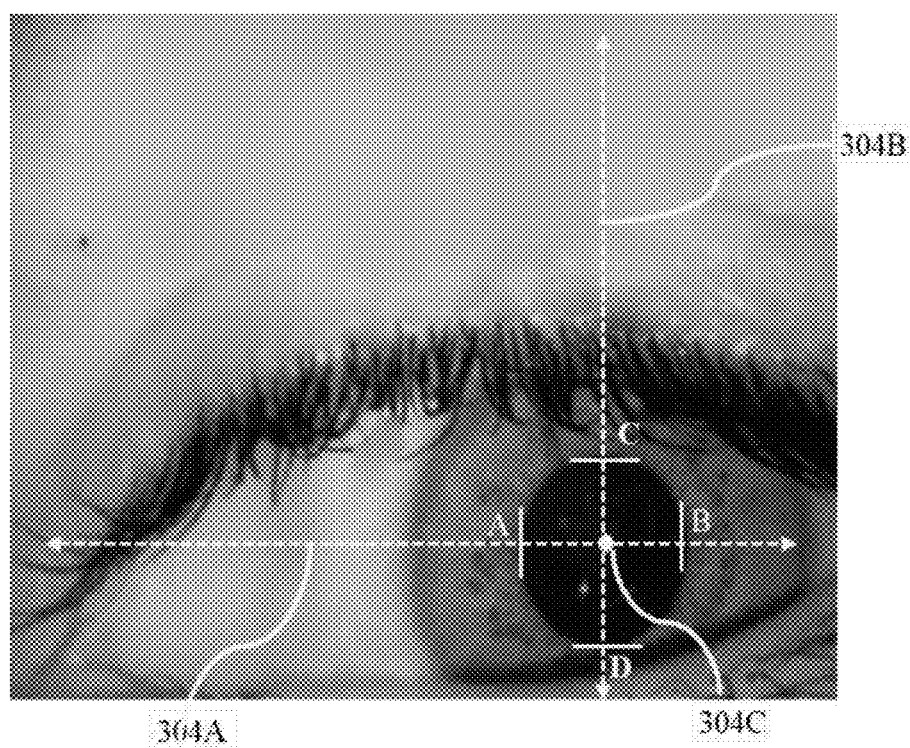

At step 206 of the method 200, the core point identification module 504 executed by the one or more hardware processors 102 is configured by the programmed instructions to identify the core point of the reflection free image as shown in FIG. 3C based on a longest continuous black pixel row and a longest continuous black pixel column. For example, the longest continuous black pixel row is represented as a line segment A-B in the horizontal line 304A of FIG. 3C. Similarly, the longest continuous black pixel column is represented as a line segment C-D in the vertical line 304B of FIG. 3C. An intersecting point between the longest continuous black pixel row and the longest continuous black pixel column is identified as the core point. In an embodiment, the longest continuous black pixel row and the longest continuous black pixel column is obtained using a pixel scanning technique. The pixel scanning technique scans the image from left to right to obtain continuous black pixel row 304A and from top to bottom to obtain continuous black pixel column 304B. The black pixel is identified using the corresponding pixel value zero. Now referring to FIG. 3C, the core point is represented as 304C.

Figure 3D:
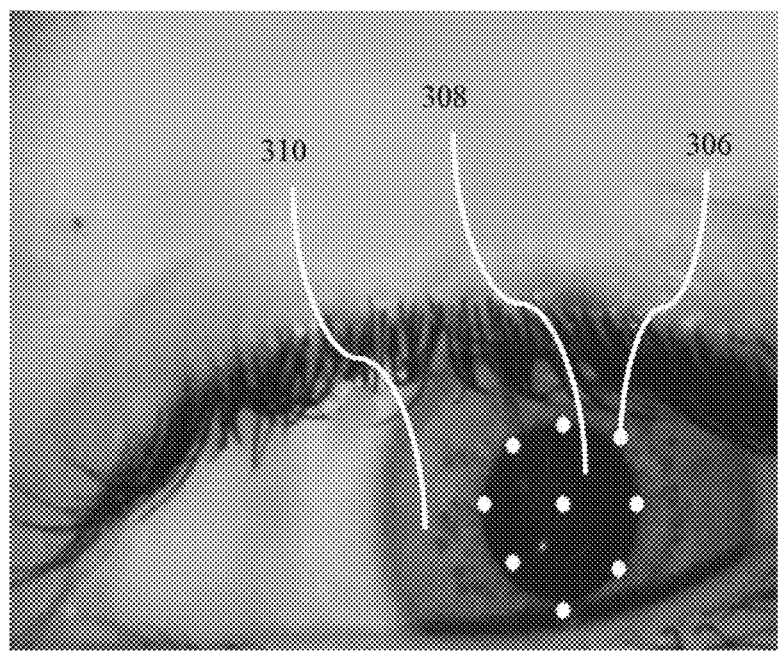

At step 208 of the method 200, the points generation module 506 executed by the one or more hardware processors 102 is configured by the programmed instructions to generate the plurality of points based on the sudden gradient change by traversing in the plurality of individual directions from the core point as shown in FIG. 3D. Now referring to FIG. 3D, the plurality of points 306 represented as white dots are obtained based on the sudden gradient change between the region 308 and 310. In an embodiment, eight points are generated. In an embodiment, the plurality of individual directions is based on the following predefined angles. For example, the predefined angles include 0, 45, 90, 135, 180, 225, 270 and 315.

Figure 3E:
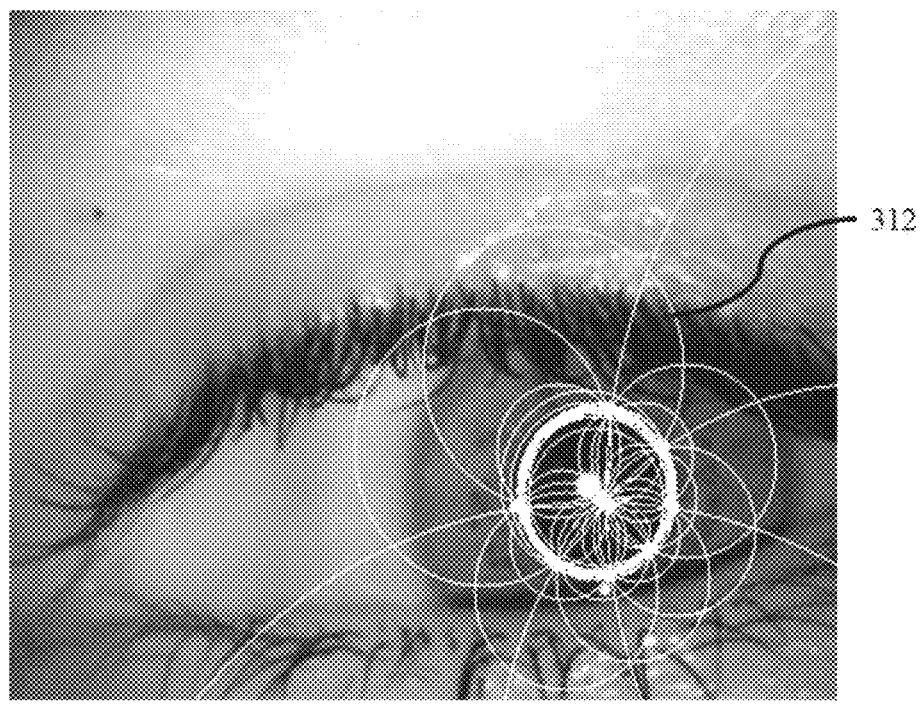

At step 210 of the method 200, the circle plotting module 508 executed by the one or more hardware processors 102 is configured by the programmed instructions to plot the plurality of circles based on the plurality of points using the permutation combination based circle plotting technique as shown in FIG. 3E. Now referring to FG. 3E, the plurality of plotted circles are illustrated. In an embodiment, the plurality of circles are plotted using circle equation. In another embodiment, the plurality of circles can be plotted using similar other methods. One such circle is represented as 312. In an embodiment, at least three points are considered at a time for plotting the plurality of circles. For example, if the plurality of points are eight and if three points are considered at a time, then there are $8C_3=56$ circles can be plotted. In an embodiment the number of points are configurable.

At step 212 of the method 200, the optimum circle identification module 510 executed by the one or more hardware processors 102 is configured by the programmed instructions to identify the optimum circle based on the plurality of circles using the score based optimum circle selection method.

Figure 3F:
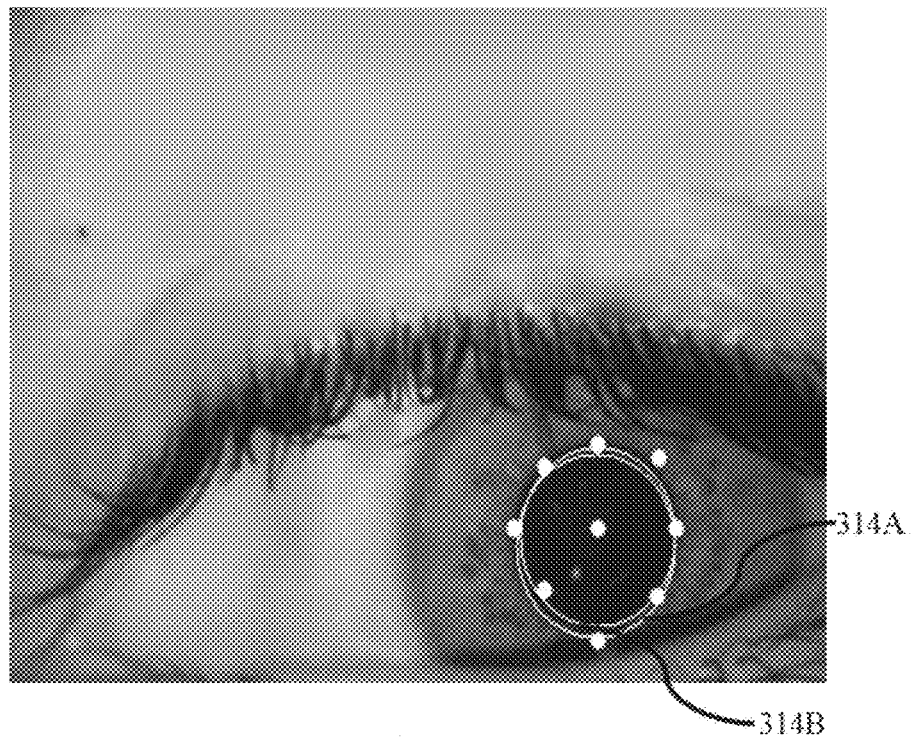
Figure 4:
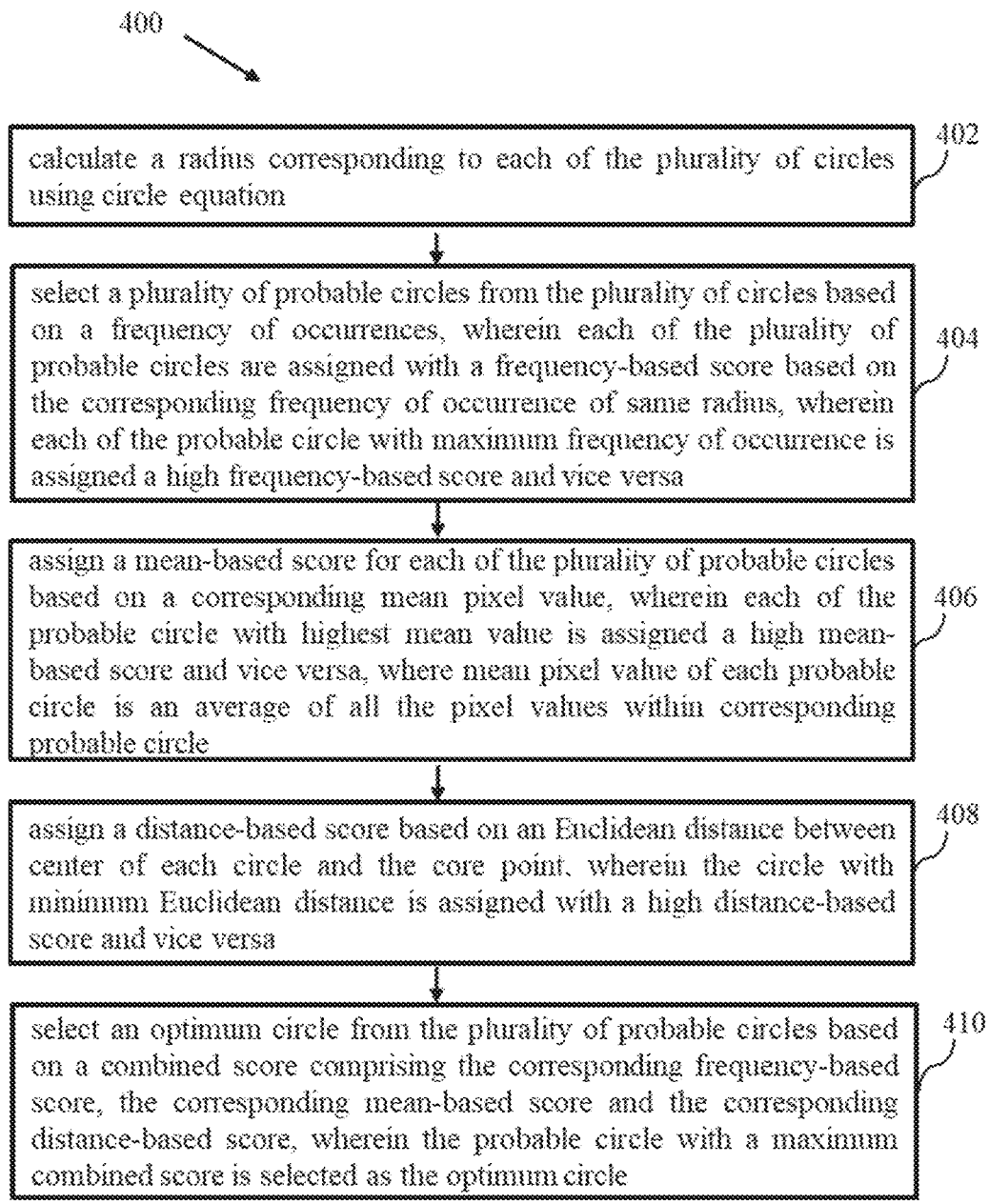
FIG. 4 is an exemplary flow diagram illustrating a score based optimal circle selection method, implemented by the system of FIG. 1, in accordance with some embodiments of the present disclosure.

In an embodiment, the score based optimum circle selection method is explained with reference to method 400 in FIG. 4. Now referring to FIG. 4, at step 402 of the method 400, a radius corresponding to each of the plurality of circles is computed using circle equation. At step 404 of the method 400, a plurality of probable circles are selected from the plurality of circles based on a frequency of occurrences. Here, each circle is differentiated using a corresponding circumference or radius. For example, two such probable circles are shown in FIG. 3F as 314A and 314B.

In an embodiment, each of the plurality of probable circles is assigned with a frequency based score based on the corresponding frequency of occurrence of same radius. Each of the probable circles with maximum frequency of occurrence is assigned a high frequency based score and vice versa. For example, a modulus is computed for each of the plurality of circles and the plurality of probable circles are selected based on the frequency of occurrence of the corresponding radius. For example, if there are two identified probable circles C1 and C2, based on the frequency of occurrence, C1 is assigned a predefined score of 1 and the circle C2 is assigned with the predefined frequency-based score as 0. If the frequency of occurrence of one or more are circles are same, then the same score value is assigned for those circles. At step 406 of the method 400, a mean based score is assigned for each of the plurality of probable circles based on a corresponding mean pixel value. Each of the probable circles with highest mean value is assigned a high mean based score and vice versa. The mean pixel value of each probable circle is an average of all the pixel values within corresponding probable circle. For example, if the mean pixel value of circle C1=8.6904 units and the mean pixel value of the circle C2=6.7051 units, then the mean based score of the circle C1=1 and the mean based score of the circle C2=0. In an embodiment, if one or more circles are having same mean pixel value, then all the circles are assigned with a same mean based score.

At step 408 of the method 400, a distance based score is assigned based on a Euclidean distance between center of each circle and the core point. The circle with minimum Euclidean distance is assigned with a high distance based score and vice versa. For example, if Euclidian distance of C1=8.0622 units and of C2=4 units, then the distance based score of C1=1 and C2=0. In an embodiment, if one or more circles are having the same Euclidian distance then the same distance based score is assigned to all circles having equal Euclidean distance.

At step 410 of the method 400, an optimum circle is selected from the plurality of probable circles based on a combined score comprising the corresponding frequency based score, the corresponding mean based score and the corresponding distance based score. The probable circle with a maximum combined score is selected as the optimum circle. For example, the optimum circle is selected based on the combined as follows: the combined score for the circle C1 is 1+1+1=3. Similarly, the combined score for the circle C2 is 0+0+0=0. Here the circle with maximum combined score, which is C1 (circle 316 of FIG. 3G) is selected as the optimum circle.

Figure 3G:
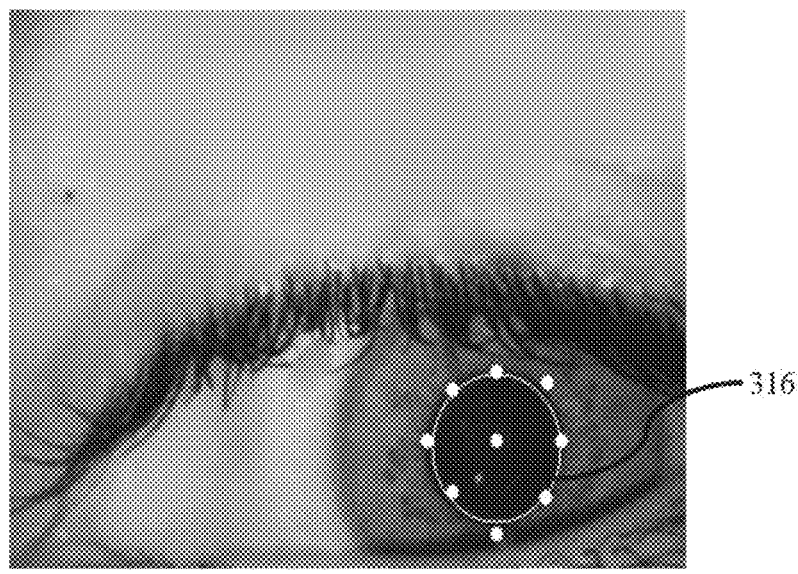

Referring back to method 200, at step 214 of the method 200, the pupil identification module 512 executed by the one or more hardware processors 102 is configured by the programmed instructions to identify the pupil that is encircled by the optimum circle, wherein an inner part of the optimum circle is identified as the pupil. For example, the optimum circle C1 of FIG. 3G is used to identify the pupil of the input image. Now referring to FIG. 3G, it is evident that the circle C1 perfectly covers the pupil of the input eye image.

In an embodiment, the present disclosure is experimented and evaluated as follows: The experimental results show higher accuracy than the conventional methods. Here accuracy is determined based on "In how many images, the pupil has been detected accurately". The present disclosure has been experiments in a plurality of datasets. In one embodiment, the present disclosure is experimented using 2240 images (10 images of 224 subjects) and an accuracy of 97.92% is obtained which is higher than the conventional approaches. In another embodiment, the present disclosure was experimented using the dataset having highly unconstrained images of different subjects and the accuracy obtained was 94% which is 10% higher than the conventional approaches.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of detecting pupil of an eye using circle formation based scoring method. The present disclosure utilizes a circle plotting approach and selects the optimum circle using several parameters. Here, an optimum circle is identified using a score based optimum circle selection method. The novel score based method combines three scores such as the radius frequency based score, the pixel value based score and the distance based score. The selection of optimum circle based on the combined scoring method provides a circle which perfectly fit in the pupil which further helps in segmentation of pupil. to identify Iris.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   receiving, by one or more hardware processors, an input image captured by an image acquisition device, wherein the input image pertains to an eye of a user;
   obtaining, by the one or more hardware processors, a reflection free image by removing ocular reflections from the input image using an inpainting algorithm;
   identifying, by the one or more hardware processors, a core point of the reflection free image based on a longest continuous black pixel row and a longest continuous black pixel column, wherein an intersecting point between the longest continuous black pixel row and the longest continuous black pixel column is identified as the core point;
   generating, by the one or more hardware processors, a plurality of points based on a sudden gradient change of pixels by traversing in a plurality of individual directions from the core point;
   plotting, by the one or more hardware processors, a plurality of circles based on the plurality of points using a permutation combination based circle plotting technique, wherein at least three points are considered at a time for plotting the plurality of circles;
   identifying, by the one or more hardware processors, an optimum circle from among the plurality of circles, using a score based optimal circle selection method, wherein the method of identifying the optimum circle from among the plurality of circles using the score based optimum circle selection method comprises:
     calculating a radius corresponding to each of the plurality of circles using circle equation;
     selecting a plurality of probable circles from the plurality of circles based on a frequency of occurrences, wherein each of the plurality of probable circles are assigned with a frequency based score based on the corresponding frequency of occurrence of same radius, wherein each of the probable circle with maximum frequency of occurrence is assigned a high frequency based score and vice versa;
     assigning a mean based score for each of the plurality of probable circles based on a corresponding mean pixel value, wherein each of the probable circle with highest mean value is assigned a high mean based score and vice versa, where mean pixel value of each probable circle is an average of all the pixel values within corresponding probable circle;
     assigning a distance based score based on an Euclidean distance between centre of each circle and the core point, wherein the circle with minimum Euclidean distance is assigned with a high distance based score and vice versa; and selecting an optimum circle from the plurality of probable circles based on a combined score comprising the corresponding frequency based score, the corresponding mean based score and the corresponding distance based score, wherein the probable circle with a maximum combined score is selected as the optimum circle; and identifying, by the one or more hardware processors, a pupil associated with the input image based on the optimum circle, wherein an inner part of the optimum circle is identified as the pupil.

2. The processor implemented method of claim 1, wherein the longest continuous black pixel row and the longest continuous black pixel column is obtained using a pixel scanning technique.

3. A system comprising:

at least one memory storing programmed instructions; one or more Input/Output (I/O) interfaces; and one or more hardware processors operatively coupled to the at least one memory, wherein the one or more hardware processors are configured by the programmed instructions to:

receive an input image captured by an image acquisition device, wherein the input image pertains to an eye of a user;

obtain a reflection free image by removing ocular reflections from the input image using an inpainting algorithm;

identify a core point of the reflection free image based on a longest continuous black pixel row and a longest continuous black pixel column, wherein an intersecting point between the longest continuous black pixel row and the longest continuous black pixel column is identified as the core point;

generate plurality of points based on a sudden gradient change of pixels by traversing in a plurality of individual directions from the core point;

plot a plurality of circles based on the plurality of points using a permutation combination based circle plotting technique, wherein at least three points are considered at a time for plotting the plurality of circles;

identify an optimum circle from among the plurality of circles, using a score based optimal circle selection method, wherein the one or more hardware processor configured to perform the method of identifying the optimum circle from among the plurality of circles using the score based optimum circle selection method by:

calculating a radius corresponding to each of the plurality of circles using circle equation;

selecting a plurality of probable circles from the plurality of circles based on a frequency of occurrences, wherein each of the plurality of probable circles are assigned with a frequency based score based on the corresponding frequency of occurrence of same radius, wherein each of the probable circle with maximum frequency of occurrence is assigned a high frequency based score and vice versa;

assigning a mean based score for each of the plurality of probable circles based on a corresponding mean pixel value, wherein each of the probable circle with highest mean value is assigned a high mean based score and vice versa, where mean pixel value of each probable circle is an average of all the pixel values within corresponding probable circle;

assigning a distance based score based on an Euclidean distance between centre of each circle and the core point, wherein the circle with minimum Euclidean distance is assigned with a high distance based score and vice versa; and selecting an optimum circle from the plurality of probable circles based on a combined score comprising the corresponding frequency based score, the corresponding mean based score and the corresponding distance based score, wherein the probable circle with a maximum combined score is selected as the optimum circle; and identify a pupil associated with the input image based on the optimum circle, wherein an inner part of the optimum circle is identified as the pupil.

4. The system of claim 3, wherein the longest continuous black pixel row and the longest continuous black pixel column is obtained using a pixel scanning technique.

5. One or more non-transitory machine readable information storage mediums comprising one or more instructions which when executed by one or more hardware processors causes:

receiving an input image captured by an image acquisition device, wherein the input image pertains to an eye of a user;

obtaining a reflection free image by removing ocular reflections from the input image using an inpainting algorithm;

identifying a core point of the reflection free image based on a longest continuous black pixel row and a longest continuous black pixel column, wherein an intersecting point between the longest continuous black pixel row and the longest continuous black pixel column is identified as the core point;

generating plurality of points based on a sudden gradient change of pixels by traversing in a plurality of individual directions from the core point;

plotting a plurality of circles based on the plurality of points using a permutation combination based circle plotting technique, wherein at least three points are considered at a time for plotting the plurality of circles;

identifying an optimum circle from among the plurality of circles, using a score based optimal circle selection method, wherein the method of identifying the optimum circle from among the plurality of circles using the score based optimum circle selection method comprises:

calculating a radius corresponding to each of the plurality of circles using circle equation;

selecting a plurality of probable circles from the plurality of circles based on a frequency of occurrences, wherein each of the plurality of probable circles are assigned with a frequency based score based on the corresponding frequency of occurrence of same radius, wherein each of the probable circle with maximum frequency of occurrence is assigned a high frequency based score and vice versa;

assigning a mean based score for each of the plurality of probable circles based on a corresponding mean pixel value, wherein each of the probable circle with highest mean value is assigned a high mean based score and vice versa, where mean pixel value of each probable circle is an average of all the pixel values within corresponding probable circle;

assigning a distance based score based on an Euclidean distance between centre of each circle and the core point, wherein the circle with minimum Euclidean distance is assigned with a high distance based score and vice versa; and selecting an optimum circle from the plurality of probable circles based on a combined score comprising the corresponding frequency based score, the corresponding mean based score and the corresponding distance based score, wherein the probable circle with a maximum combined score is selected as the optimum circle; and identifying a pupil associated with the input image based on the optimum circle, wherein an inner part of the optimum circle is identified as the pupil.

6. The one or more non-transitory machine readable information storage mediums of claim 5, wherein the longest continuous black pixel row and the longest continuous black pixel column is obtained using a pixel scanning technique.

* * * * *